(12) United States Patent
Hu et al.

(10) Patent No.: US 11,410,690 B2
(45) Date of Patent: Aug. 9, 2022

(54) TWO-DIMENSIONAL MAGNETIC RECORDING READER WITH DUAL FREE LAYER MAGNETIC TUNNEL JUNCTION

(71) Applicant: Western Digital Technologies, Inc., San Jose, CA (US)

(72) Inventors: Chih-Ching Hu, Pleasanton, CA (US); Yung-Hung Wang, San Jose, CA (US); Ming Mao, Dublin, CA (US); Guanxiong Li, Fremont, CA (US); Daniele Mauri, San Jose, CA (US); Xiaoyong Liu, San Jose, CA (US); Yukimasa Okada, Cupertino, CA (US); Anup Roy, Fremont, CA (US); Chen-Jung Chien, Mountain View, CA (US); Hongxue Liu, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/899,366

(22) Filed: Jun. 11, 2020

(65) Prior Publication Data

US 2021/0390978 A1 Dec. 16, 2021

(51) Int. Cl.
*G11B 5/39* (2006.01)
(52) U.S. Cl.
CPC .......... *G11B 5/3954* (2013.01); *G11B 5/3909* (2013.01); *G11B 5/3912* (2013.01); *G11B 5/3932* (2013.01); *G11B 2005/3996* (2013.01)

(58) Field of Classification Search
None
See application file for complete search history.

(56) References Cited

U.S. PATENT DOCUMENTS

| | | | | |
|---|---|---|---|---|
| 8,891,207 | B1 * | 11/2014 | Li et al. | G11B 5/397 |
| | | | | 360/316 |
| 9,042,058 | B1 * | 5/2015 | Li et al. | G11B 5/3912 |
| | | | | 360/316 |
| 9,042,059 | B1 | 5/2015 | Katine et al. | |
| 9,076,468 | B1 * | 7/2015 | Keener et al. | G11B 5/3932 |
| 9,087,527 | B1 * | 7/2015 | Li et al. | G11B 5/3912 |
| 9,230,578 | B2 | 1/2016 | Batra et al. | |
| 9,786,305 | B1 * | 10/2017 | Li et al. | G11B 5/3912 |
| 10,777,222 | B1 * | 9/2020 | Liu et al. | G11B 5/3932 |
| 2004/0021982 | A1 * | 2/2004 | Ozue et al. | G11B 5/3951 |
| | | | | 360/123.09 |
| 2009/0213502 | A1 * | 8/2009 | Miyauchi et al. | G11B 5/3932 |
| | | | | 360/319 |

(Continued)

Primary Examiner — Craig A. Renner
(74) Attorney, Agent, or Firm — Patterson + Sheridan, LLP; Steven H. Versteeg

(57) ABSTRACT

The present disclosure generally related to a two dimensional magnetic recording (TDMR) read head having a magnetic tunnel junction (MTJ). Both the upper reader and the lower reader have a dual free layer (DFL) MTJ structure between two shields. A synthetic antiferromagnetic (SAF) soft bias structure bounds the MTJ, and a rear hard bias (RHB) structure is disposed behind the MTJ. The DFL MTJ decreases the distance between the upper and lower reader and hence, improves the area density capacity (ADC). Additionally, the SAF soft bias structures and the rear head bias structure cause the dual free layer MTJ to have a scissor state magnetic moment at the media facing surface (MFS).

20 Claims, 14 Drawing Sheets

(56) References Cited

U.S. PATENT DOCUMENTS

| | | | |
|---|---|---|---|
| 2011/0051291 A1* | 3/2011 | Miyauchi et al. ... | G11B 5/3932 360/319 |
| 2011/0216432 A1* | 9/2011 | Yanagisawa ............ | G11B 5/33 360/315 |
| 2011/0279923 A1* | 11/2011 | Miyauchi et al. ... | G11B 5/3912 360/319 |
| 2014/0153138 A1* | 6/2014 | Le et al. ............... | G11B 5/3909 360/319 |
| 2014/0376130 A1* | 12/2014 | Takeo et al. ......... | G11B 5/3932 360/125.17 |
| 2015/0243302 A1* | 8/2015 | Kief et al. ........... | G11B 5/3912 360/245.8 |
| 2015/0255092 A1* | 9/2015 | Macken et al. ...... | G11B 5/3932 360/324 |
| 2016/0055868 A1* | 2/2016 | Gao et al. ........... | G11B 5/3932 360/319 |
| 2016/0336030 A1* | 11/2016 | Xiao et al. ........... | G11B 5/3932 |
| 2017/0154641 A1* | 6/2017 | Hao et al. ............ | G11B 5/3912 |

* cited by examiner

_US 11,410,690 B2_

TWO-DIMENSIONAL MAGNETIC RECORDING READER WITH DUAL FREE LAYER MAGNETIC TUNNEL JUNCTION

BACKGROUND OF THE DISCLOSURE

Field of the Disclosure

Embodiments of the present disclosure generally relate to a dual free layer (DFL) magnetic tunnel junction (MTJ) two dimensional magnetic recording (TDMR) read head.

Description of the Related Art

Two dimensional magnetic recording (TDMR) read heads have a first sensor, oftentimes referred to as a lower reader and a second sensor, oftentimes referred to as an upper reader. The readers each has lower and upper shields with an insulating reader separation gap (RSG) therebetween.

TDMR read heads typically have an MTJ structure with an antiferromagnetic layer, a synthetic antiferromagnetic pinned layer (SAF PL), an insulating barrier thereon, and a free magnetic layer. A capping layer may optionally be present on the free magnetic layer. The free magnetic layer is biased longitudinally from the side of the MTJ structure by a soft bias layer. Both the top reader and the bottom reader are substantially identical.

The SAF PL is not very reliable in a TDMR structure because in order to effectively pin the SAF PL, annealing needs to occur separately for the upper reader and the lower reader. In order for the SAF PL to have a desired crystallinity, the SAF PL is annealed within a limited annealing range. Absent the desired crystallinity, the lower reader MTJ suffers from a performance degradation due to atomic interdiffusion at elevated temperatures. Additionally, the SAF PL is quite thick, which increases the distance between the upper reader and lower reader in the down track direction, which lowers the area density capacity (ADC).

Therefore, there is a need in the art for an improved TDMR and method of manufacture.

SUMMARY OF THE DISCLOSURE

The present disclosure generally related to a two dimensional magnetic recording (TDMR) read head having a magnetic tunnel junction (MTJ). Both the upper reader and the lower reader have a dual free layer (DFL) MTJ structure between two shields. A synthetic antiferromagnetic (SAF) soft bias (SB) structure bounds the MTJ, and a rear hard bias (RHB) structure is disposed behind the MTJ. The DFL MTJ decreases the distance between the upper and lower reader and hence, improves the area density capacity (ADC). Additionally, the SAF SB structures and the RHB structure cause the DFL MTJ to have a scissor state magnetic moment at the media facing surface (MFS).

In one embodiment, a two dimensional magnetic recording (TDMR) head comprises: a first reader including: a first lower shield; a first dual free layer (DFL) sensor disposed over the first lower shield; and an first upper shield disposed over the first DFL sensor; an insulating reader separation gap disposed over the first reader; and a second reader disposed over the insulating reader separation gap, the second reader including: a second lower shield; a second DFL sensor disposed over the second lower shield; and a second upper shield disposed over the second DFL sensor.

In another embodiment, a two dimensional magnetic recording (TDMR) head comprises: a first reader including: a first lower shield; a first sensor disposed over the first lower shield; a first upper shield disposed over the first sensor; and a first rear hard bias structure disposed behind the first sensor; an insulating reader separation gap disposed over the first reader; and a second reader disposed over the insulating reader separation gap, the second reader including: a second lower shield; a second sensor disposed over the second lower shield; a second upper shield disposed over the second sensor; and a second rear hard bias structure disposed behind the second sensor.

In another embodiment, a two dimensional magnetic recording (TDMR) head comprises: a first reader including: a first lower shield; a first sensor disposed over the first lower shield; an first upper shield disposed over the first sensor; and a first synthetic antiferromagnetic (SAF) soft bias (SB) structure disposed adjacent the first sensor; an insulating reader separation gap disposed over the first reader; and a second reader disposed over the insulating reader separation gap, the second reader including: a second lower shield; a second sensor disposed over the second lower shield; a second upper shield disposed over the second sensor; and a second SAF SB structure disposed adjacent the second sensor.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally related to a two dimensional magnetic recording (TDMR) read head having a magnetic tunnel junction (MTJ). Both the upper reader and the lower reader have a dual free layer (DFL) MTJ structure between two shields. A synthetic antiferromagnetic (SAF) soft bias (SB) structure bounds the MTJ, and a rear hard bias (RHB) structure is disposed behind the MTJ. The DFL MTJ decreases the distance between the upper and lower reader and hence, improves the area density capacity (ADC). Additionally, the SAF SB structures and the RHB structure cause the DFL MTJ to have a scissor state magnetic moment at the media facing surface (MFS).

Figure 1:
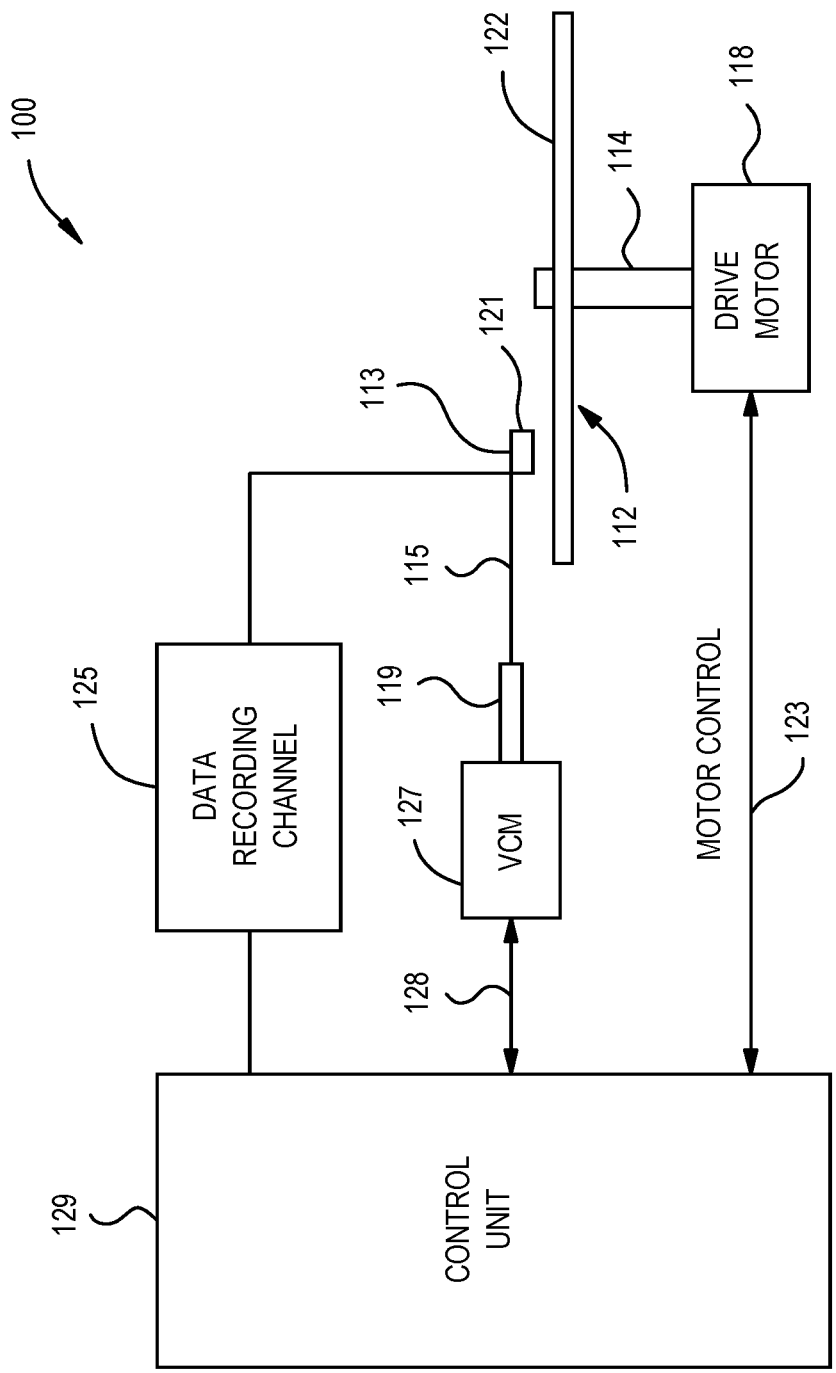
FIG. 1 is a schematic illustration of certain embodiments of a magnetic media drive including a magnetic read head.

FIG. 1 is a schematic illustration of certain embodiments of a magnetic media drive 100 including a magnetic write head and a magnetic read head. The magnetic media drive 100 may be a single drive/device or comprise multiple drives/devices. The magnetic media drive 100 includes a magnetic recording medium, such as one or more rotatable magnetic disk 112 supported on a spindle 114 and rotated by a drive motor 118. For the ease of illustration, a single disk drive is shown according to one embodiment. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a write head and a read head comprising a TMR device. As the magnetic disk 112 rotates, the slider 113 moves radially in and out over the disk surface 122 so that the head assembly 121 may access different tracks of the magnetic disk 112 where desired data are written or read. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic media drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the magnetic media drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
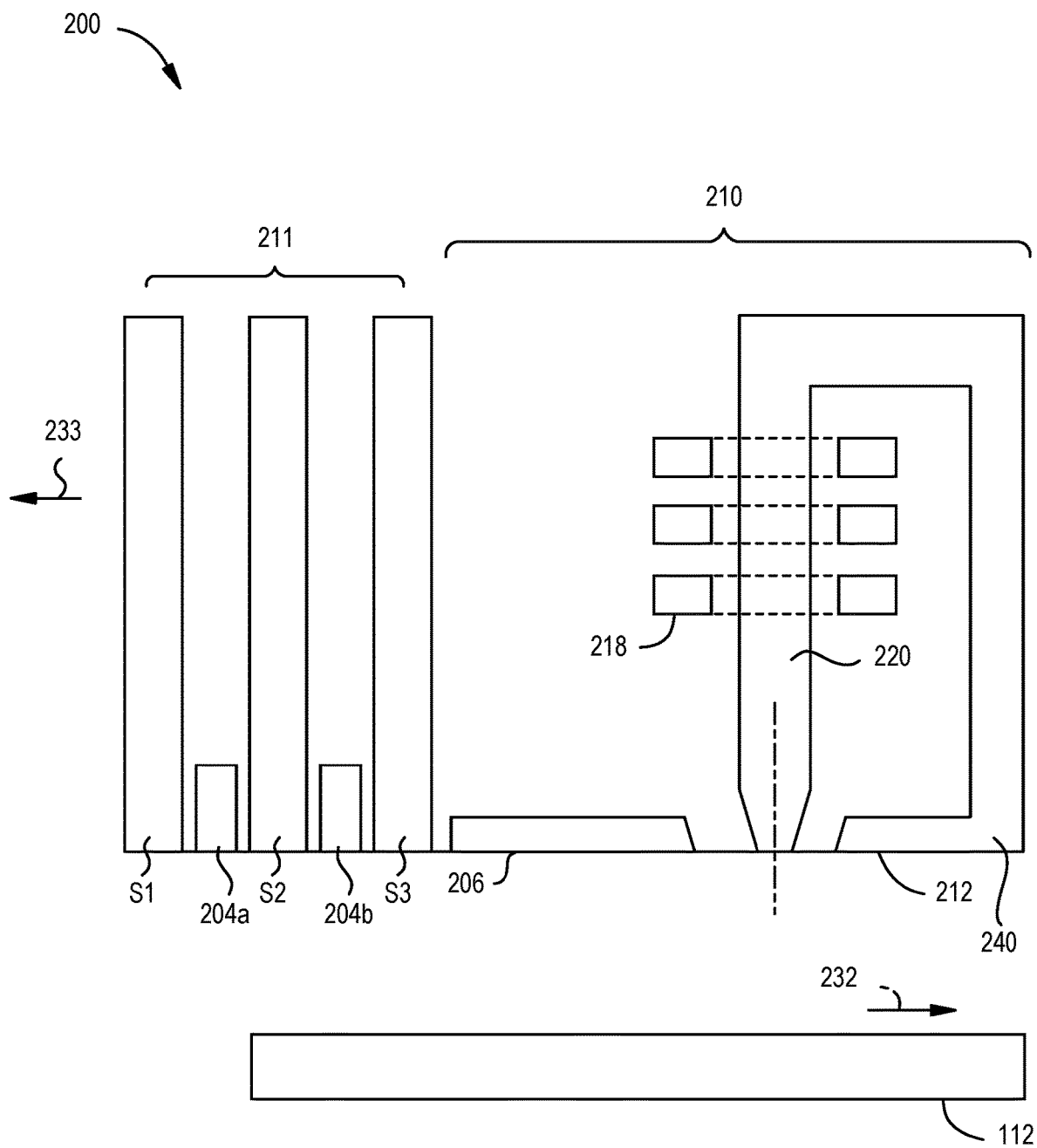
FIG. 2 is a schematic illustration of certain embodiments of a cross sectional side view of a head assembly facing a magnetic storage medium.

FIG. 2 is a schematic illustration of certain embodiments of a cross sectional side view of a head assembly 200 facing the magnetic disk 112 or other magnetic storage medium. The head assembly 200 may correspond to the head assembly 121 described in FIG. 1. The head assembly 200 includes a media facing surface (MFS) 212 facing the magnetic disk 112. As shown in FIG. 2, the magnetic disk 112 relatively moves in the direction indicated by the arrow 232 and the head assembly 200 relatively moves in the direction indicated by the arrow 233.

The head assembly 200 includes a magnetic read head 211. The magnetic read head 211 includes a first sensing element 204a disposed between shields S1 and S2, as well as a second sensing element 204b disposed between the shields S2 and S3. The sensing elements 204a, 204b and the shields S1, S2, and S3 all have surfaces at the MFS 212 facing the magnetic disk 112. The sensing elements 204a, 204b are, in one embodiment, TMR devices sensing the magnetic fields of the recorded bits, such as perpendicular recorded bits or longitudinal recorded bits, in the magnetic disk 112 by a TMR effect. In certain embodiments, the spacing between shields S1 and S2 and the spacing between shields S2 and S3 is about 17 nm or less.

The head assembly 200 may include a write head 210. The write head 210 includes a main pole 220, a leading shield 206, and a trailing shield (TS) 240. The main pole 220 comprises a magnetic material and serves as a main electrode. Each of the main pole 220, the leading shield 206, and the TS 240 has a front portion at the MFS 212. The write head 210 includes a coil 218 around the main pole 220 that excites the main pole 220 producing a writing magnetic field for affecting a magnetic recording medium of the rotatable magnetic disk 112. The coil 218 may be a helical structure or one or more sets of pancake structures. The TS 240 comprises a magnetic material, serving as a return pole for the main pole 220. The leading shield 206 may provide electromagnetic shielding and is separated from the main pole 220 by a leading gap 254.

Figure 3A:
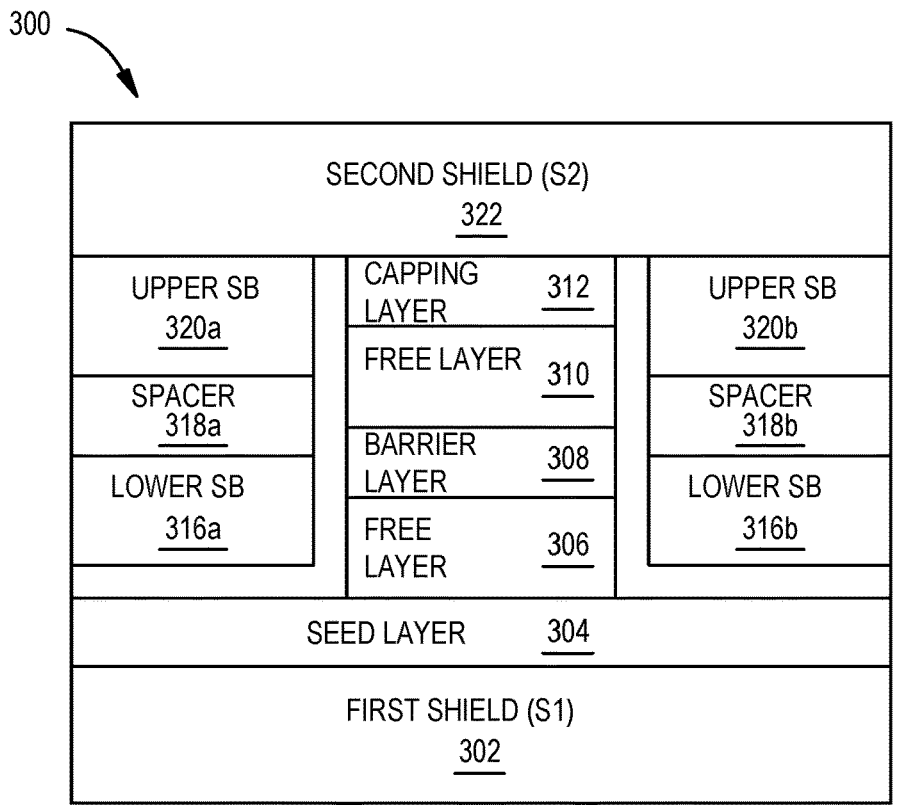
FIGS. 3A-3D are schematic illustrations of a dual free layer (DFL) read head, according to various embodiments.

FIGS. 3A-3D are schematic illustrations of a DFL read head 300. FIG. 3A is an ABS view of the read head 300. The read head 300 includes a first shield (S1) 302, a seed layer 304, a first free layer (FL) 306, a barrier layer 308, a second FL 310, a capping layer 312, and a second shield (S2) 322. The seed layer 304 includes a material selected from the group that includes tantalum (Ta), tungsten (W), and combinations thereof. In one embodiment, the barrier layer 308 comprises MgO. The read head 300 further includes a first synthetic antiferromagnetic (SAF) soft bias (SB) (e.g., a side shield) that includes a first lower SB 316a, a first spacer 318a such as ruthenium, and a first upper SB 320a and a second SAF SB that includes a second lower SB 316b, a second spacer 318b such as ruthenium, and a second upper SB 320b. The magnetic moments for the first FL 306 and the second FL 310 may be antiparallel due to the antiparallel biasing from the SAF SB.

Figure 3B:
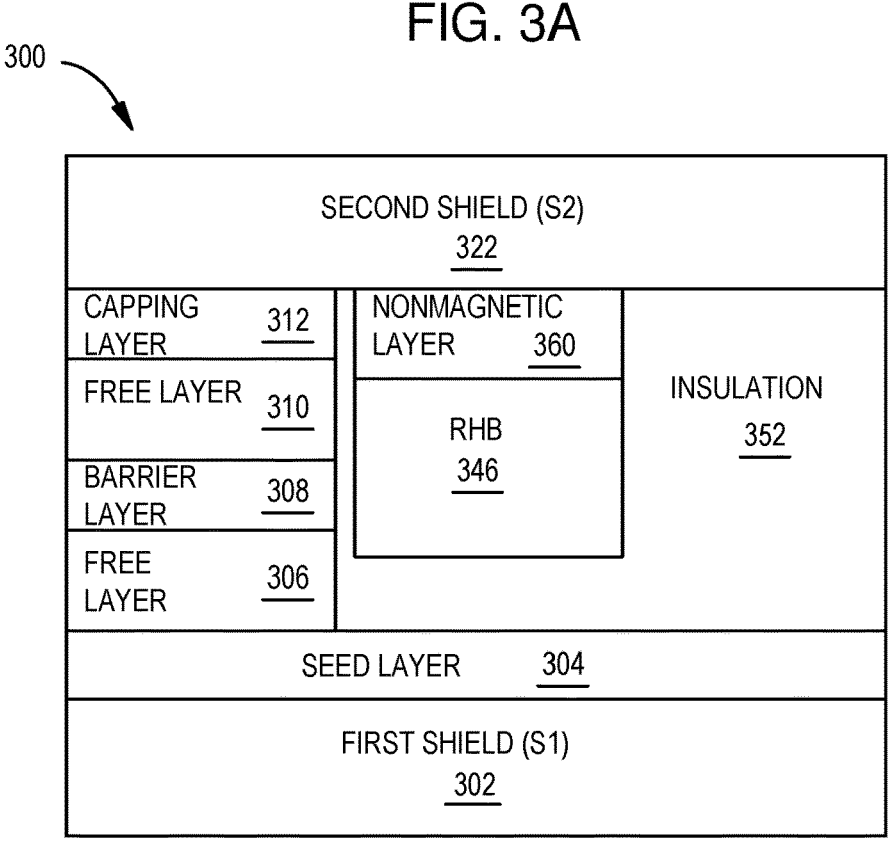

FIG. 3B is an APEX view of the read head 300. The read head 300 further includes a rear hard bias (RHB) 346 and an insulation 352. The insulation 352 may be aluminum oxide (AlOx) or any other suitable insulation material. The RHB 346 generates a magnetic field pointing away from the insulation 352 and towards the following layers: the first FL 306, the barrier layer 308, the second FL 310, and the capping layer 312. The RHB 346 may include cobalt platinum (CoPt), and it is magnetically decoupled with shield 322 by inserting a nonmagnetic layer 360 between 346 and 322.

Figure 3C:
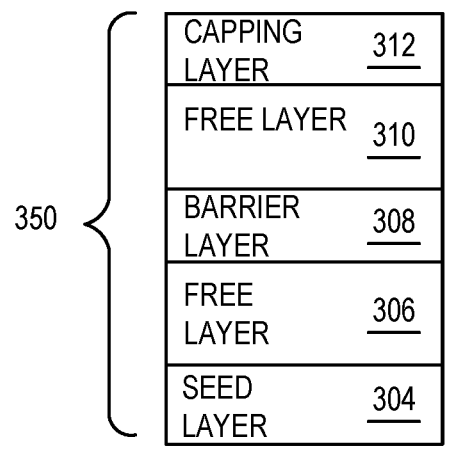

FIG. 3C is a schematic illustration of a magnetic tunnel junction (MTJ) stack 350 of the read head 300, according to one embodiment. The MTJ stack 350 includes the seed layer 304, the first FL 306, the barrier layer 308, the second FL 310, and the capping layer 312.

Figure 3D:
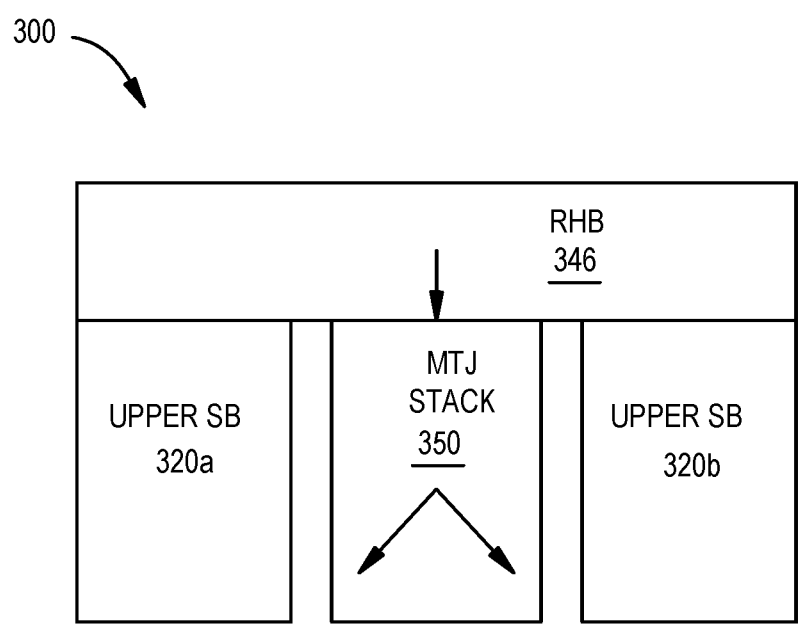

FIG. 3D is a top view of the read head 300 showing the MTJ stack 350's response to an external magnetic field. The RHB 346 generates a magnetic field pointing towards the MTJ stack 350. The RHB 346 is formed behind the MTJ stack 350. The magnetic moments of the first FL 306 and the second FL 310 are tilted towards each SB. The resulting magnetic moments may be referred to as a "scissor" state.

Figure 4A:
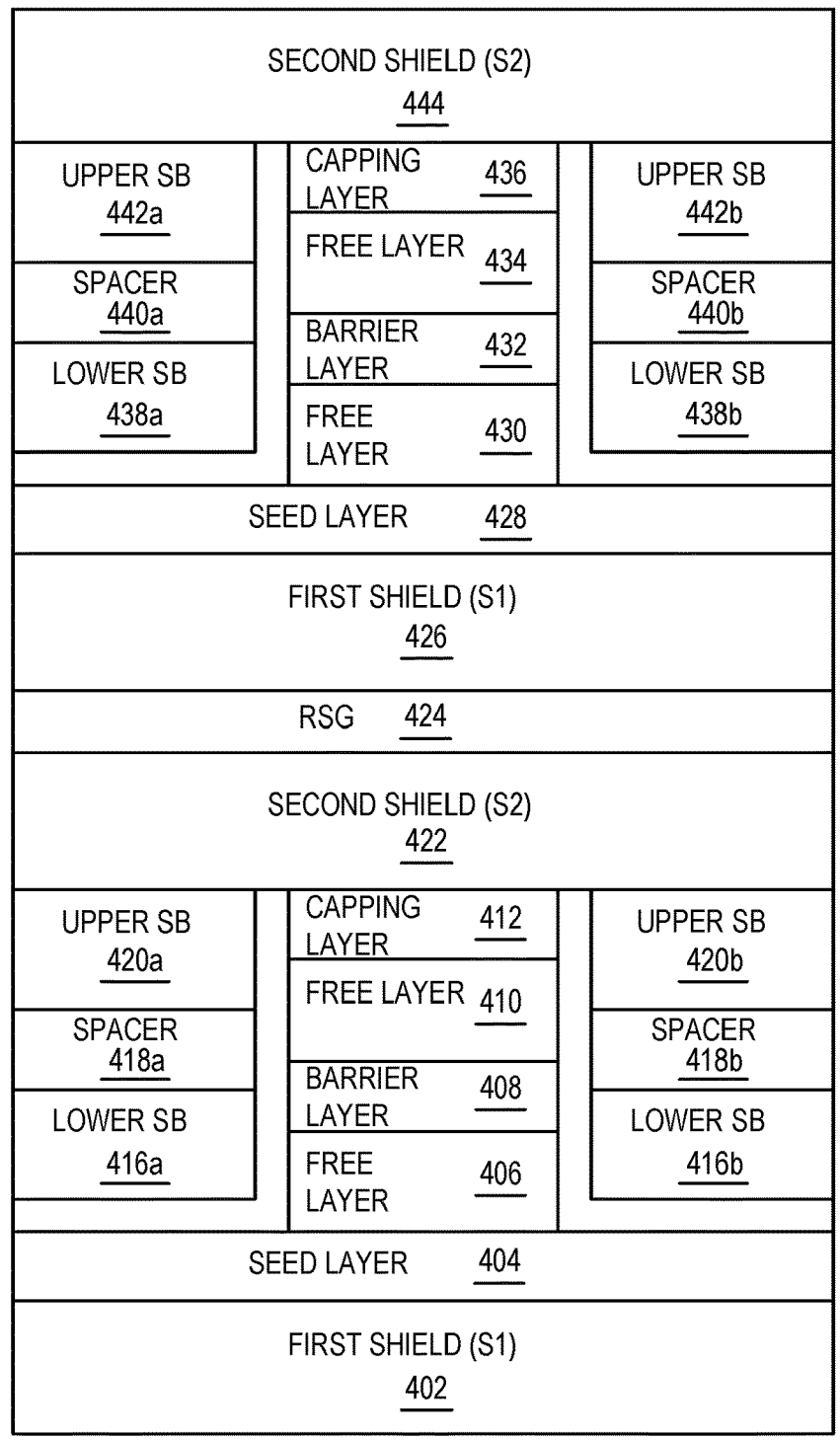
FIGS. 4A-4C are schematic illustrations of a TDMR read head, according to one embodiment.
Figure 4B:
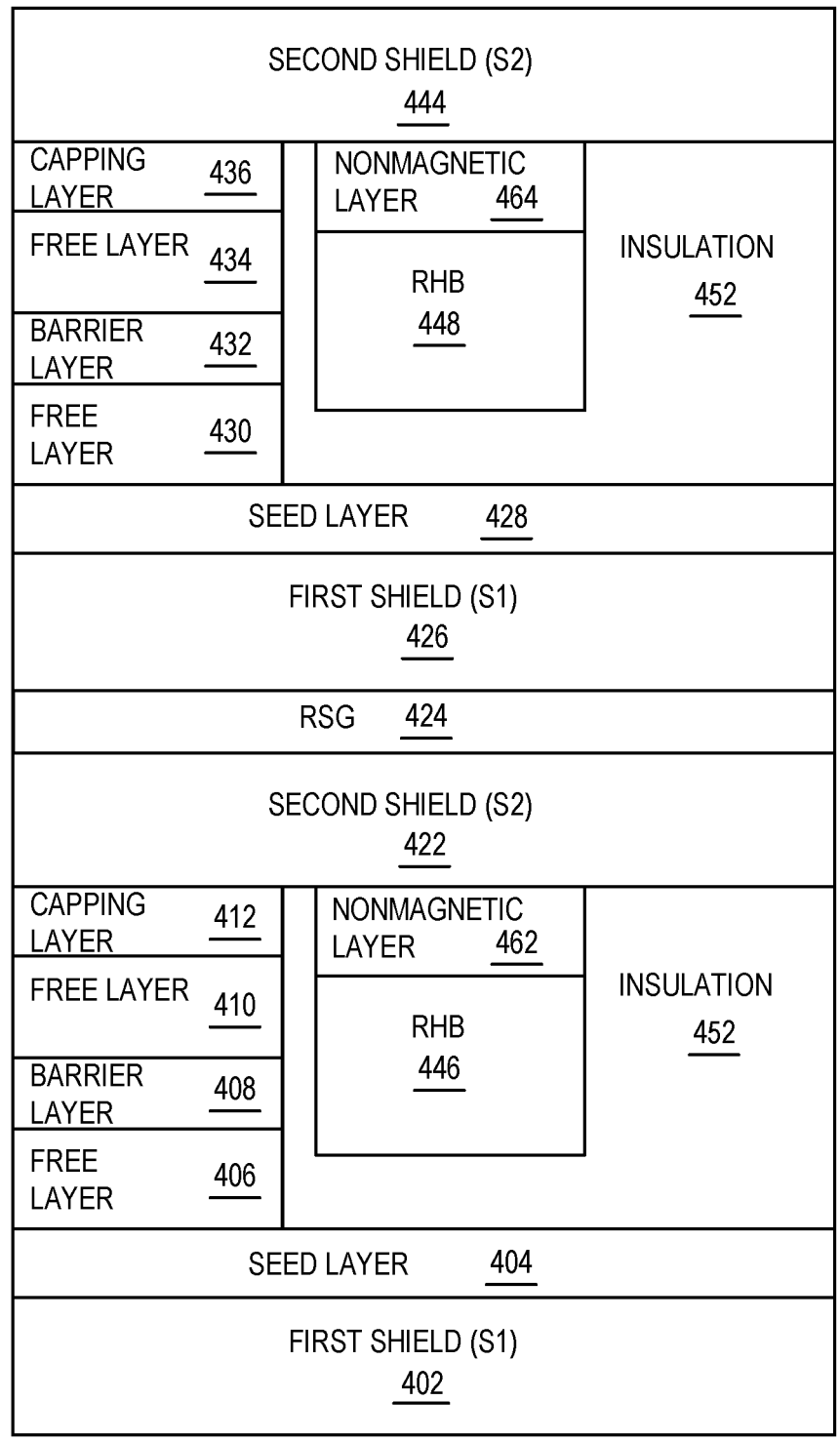
Figure 4C:
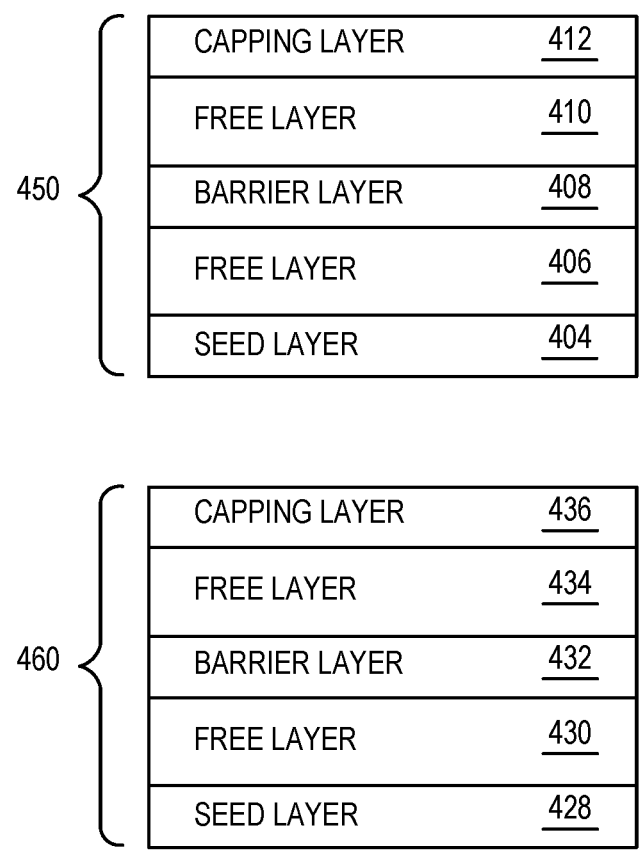

FIGS. 4A-4C are schematic illustrations of a TDMR read head 400 according to one embodiment. Aspects of the FIGS. 3A-3D may be similar to the description of the TDMR read head 400 of FIGS. 4A-4C.

FIG. 4A is an ABS view of a TDMR read head 400, according to one embodiment. The TDMR read head 400 includes a first reader that includes first shield (S1) 402, a seed layer 404, a first free layer (FL) 406, a barrier layer 408, a second FL 410, a capping layer 412, and a second shield (S2) 422. The seed layer 404 includes a material selected from the group that includes tantalum, tungsten, and combinations thereof. The barrier layer 408 includes an insulating material such as MgO. The first reader further includes a first SAF SB that includes a first lower SB 416a, a first spacer 418a comprising a material such as ruthenium, and a first upper SB 420a and a second SAF SB that includes a second lower SB 416b, a second spacer 418b comprising a material such as ruthenium, and a second upper SB 420b. The magnetic moments for the first FL 406 and the second FL 410 may be antiparallel due to the antiparallel biasing from the SAF SB.

An insulating reader separation gap (RSG) 424 separates the first reader and the second reader. The insulating RSG 424 may be formed by an AlOx compound or any other suitable insulating material.

The TDMR read head 400 further includes a second reader that includes a first shield (S1) 426, a seed layer 428, a first free layer (FL) 430, a barrier layer 432, a second FL 434, a capping layer 436, and a second shield (S2) 444. The seed layer 428 includes a material selected from the group that includes tantalum, tungsten, and combinations thereof. In one embodiment, the barrier layer 432 comprises MgO. The second reader further includes a first SAF SB that includes a first lower SB 438a, a first spacer 440a comprising a material such as ruthenium, and a first upper SB 442a and a second SAF SB that includes a second lower SB 438b, a second spacer 440b comprising a material such as ruthenium, and a second upper SB 442b. The magnetic moments for the first FL 430 and the second FL 434 may be antiparallel due to the antiparallel biasing from the SAF SB.

FIG. 4B is an APEX view of a TDMR read head 400, according to another embodiment. The first reader further includes a rear hard bias (RHB) 446 behind the MTJ stack 450 and an insulation 452. The insulation 452 may be aluminum oxide (AlOx) or any other suitable insulation material. The RHB 446 generates a magnetic field pointing away from the insulation 452 and towards the following layers: the first FL 406, the barrier layer 408, the second FL 410, and the capping layer 412. The RHB 446 may include cobalt platinum (CoPt) disposed on a tantalum and/or tungsten seed layer, and is magnetically decoupled with second shield 422 by inserting a nonmagnetic layer 462 between the RHB 446 and the second shield 422.

The second reader further includes a rear hard bias (RHB) 448 behind the MTJ stack 460 and an insulation 452. The insulation 452 may be aluminum oxide (AlOx) or any other suitable insulation material. The RHB 448 generates a magnetic field pointing away from the insulation 452 and towards the following layers: the first FL 430, the barrier layer 432, the second FL 434, and the capping layer 436. The RHB 448 may include cobalt platinum (CoPt) disposed on a tantalum and/or tungsten seed layer, and is magnetically decoupled with second shield 444 by inserting a nonmagnetic layer 464 between the RHB 448 and the second shield 444.

FIG. 4C is a schematic illustration of a magnetic tunnel junction (MTJ) stack 450 of the TDMR read head 400, according to various embodiments. The first MTJ stack 450 of the first reader includes the seed layer 404, the first FL 406, the barrier layer 408, the second FL 410, and the capping layer 412. The second MTJ stack 460 of the second reader includes the seed layer 428, the first FL 430, the barrier layer 432, the second FL 434, and the capping layer 436.

Figure 5:
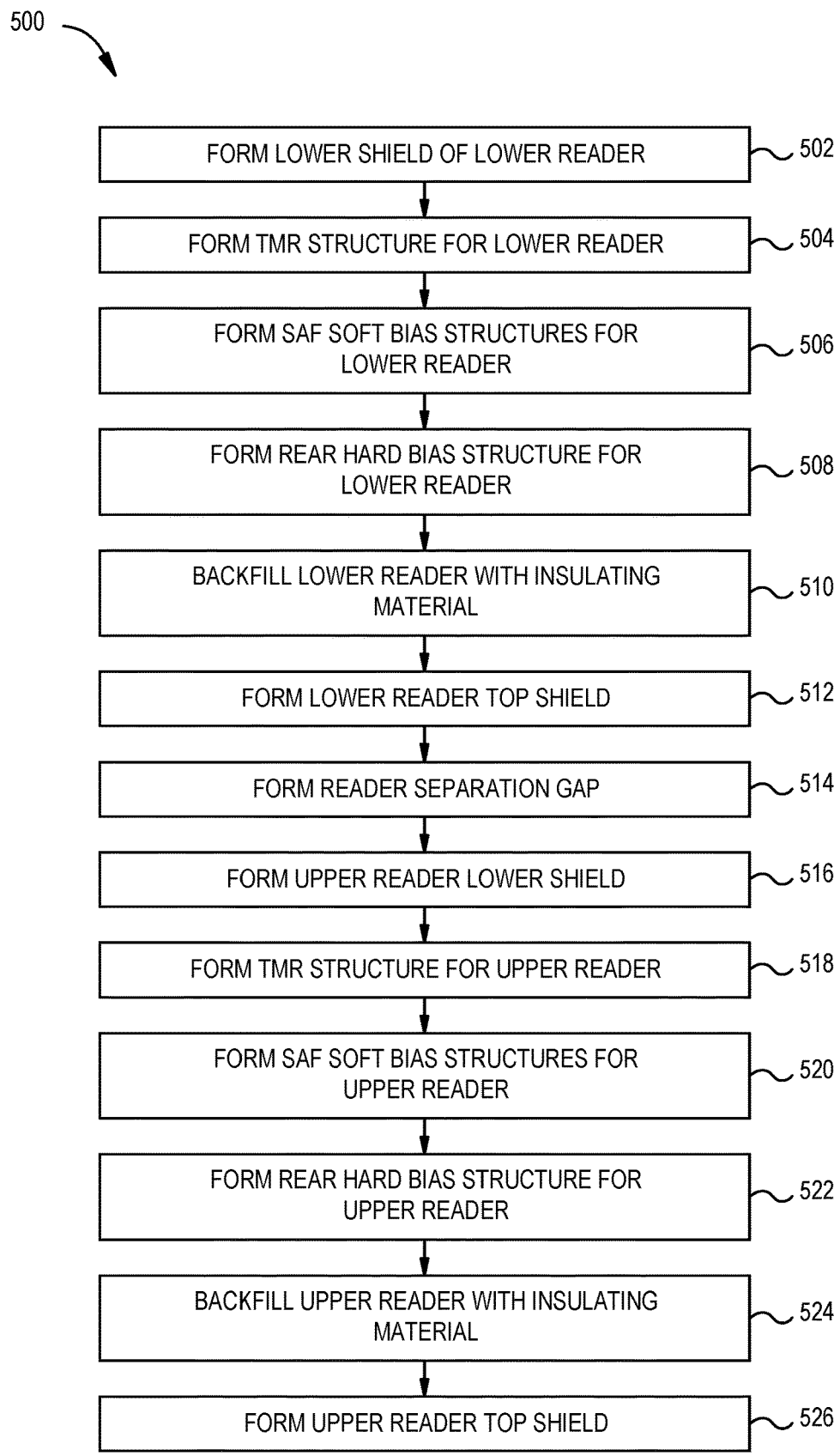
FIG. 5 is a flowchart illustrating a method of making a TDMR read head, according to one embodiment.

FIG. 5 is a flowchart illustrating a method 500 of making a TDMR read head, according to one embodiment. The method 500 will be described concurrently with the schematic illustrations of a TDMR read head 600 at various stages of manufacture of FIGS. 6A-6H. Aspects of FIGS. 6A-6H may be similar to the components previously described above.

Figure 6A:
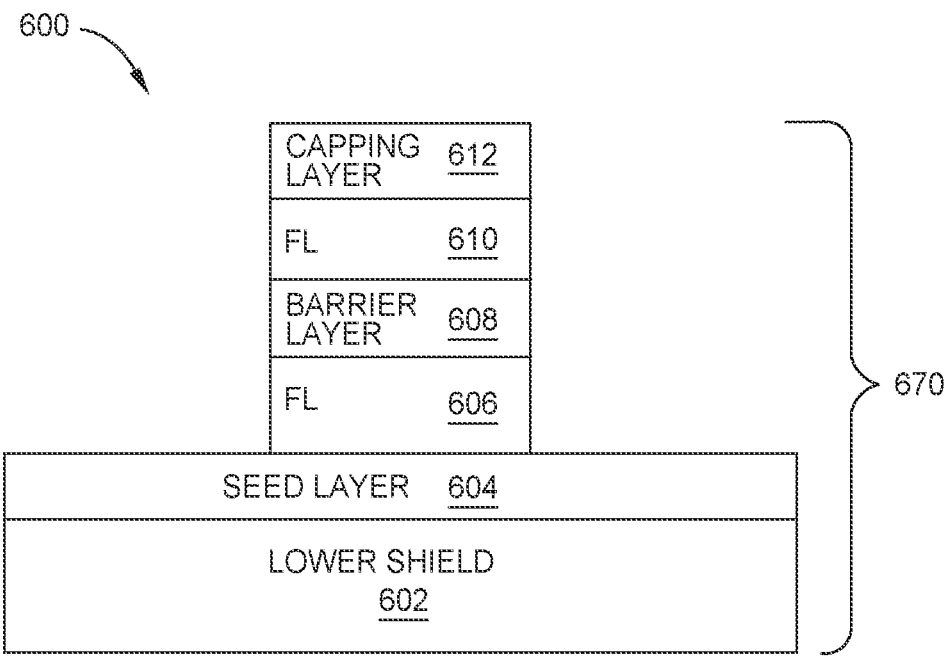
FIGS. 6A-6H are schematic illustrations of a TDMR read head at various stages of manufacture.

In FIG. 6A, the lower shield 602, such as the S1 402 of the first reader of FIG. 4A, of the lower reader 670 is formed at block 502. The TMR structure is formed on the lower shield 602 of the lower reader 670 at block 504. The TMR structure includes the MTJ stack that includes the seed layer 604, the first FL 606, the barrier layer 608, the second FL 610, and the capping layer 612. Magnetic annealing of the TMR structure may or may not be required after the TMR structure deposition.

Figure 6B:
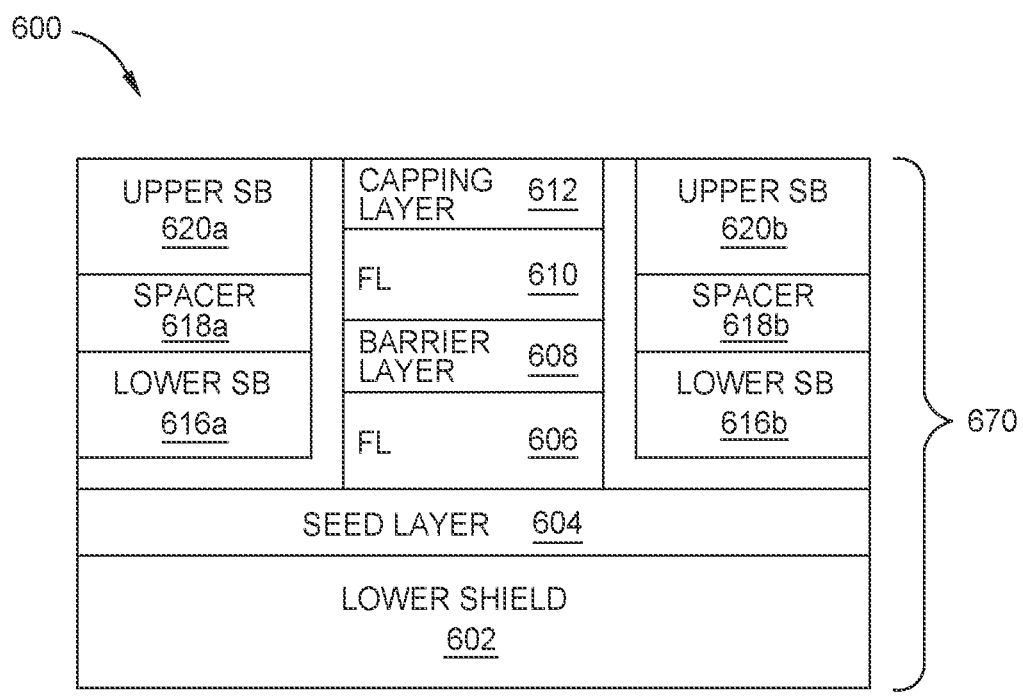

In FIG. 6B, the SAF SB structures, such as the first lower SB 616a, the first spacer 618a, the first upper SB 620a, the second lower SB 616b, the second spacer 618b, and the second upper SB 620b, of the lower reader 670 are formed at block 506. At block 504 and block 506, the process may include mask layer deposition and photo printing, RIE etching to form carbon hard mask (CHM) stencil, ion milling to define lower MTJ, junction insulation by atomic layer deposition (ALD) or ion beam deposition (IBD), SB deposition, side wall mill open, resist strip, and chemical mechanical polishing (CMP).

Figure 6C:
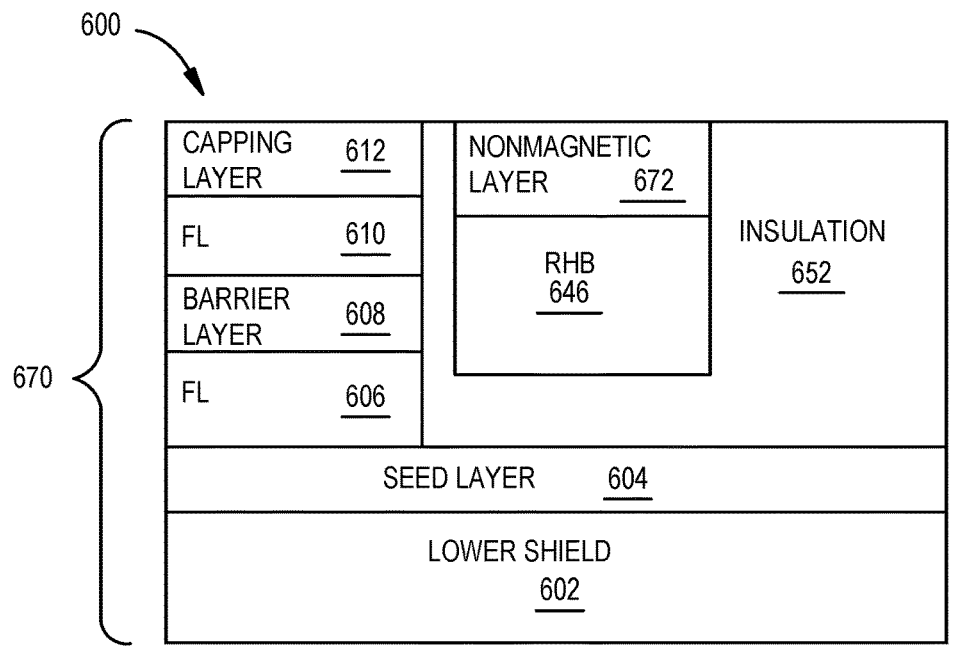

In FIG. 6C, the RHB structure 646 is formed for the lower reader 670 through a process of RHB deposition at block 508 and a nonmagnetic layer 672 is formed thereon. At block 510, the lower reader 670 is backfilled with junction insulation 652 (insulation 652). The process at block 508 and block 510 may also include photo printing, RIE etching, ion milling to define lower MTJ back edge, and junction insulation 652 by ALD or IBD. The junction insulation 652 may be an AlOx deposition. The RHB 646 in one embodiment includes seed layers such as Ta and W, a permanent magnet (e.g., CoPt), and a nonmagnetic capping layer (e.g., Ta). In order to prevent the magnet from corrosion during CMP and to generate topography that limits TDMR down track spacing (DTS) and lead resistance, a glancing angle milling is applied to flatten the RHB 646. The DTS is the spacing between the first free layer 606 of the lower reader 670 and the first free layer 630 of the upper reader 680. After the capping layer 612 deposition (e.g., a Ta cap), a second glancing angle milling is applied to the MTJ stack to further flatten the RHB 646. After the milling occurs, the resist strip and CMP is applied to achieve device surface planarization. Furthermore, the electric lapping guide (ELG) may be formed during the steps outlined in block 508 and block 510.

Figure 6D:
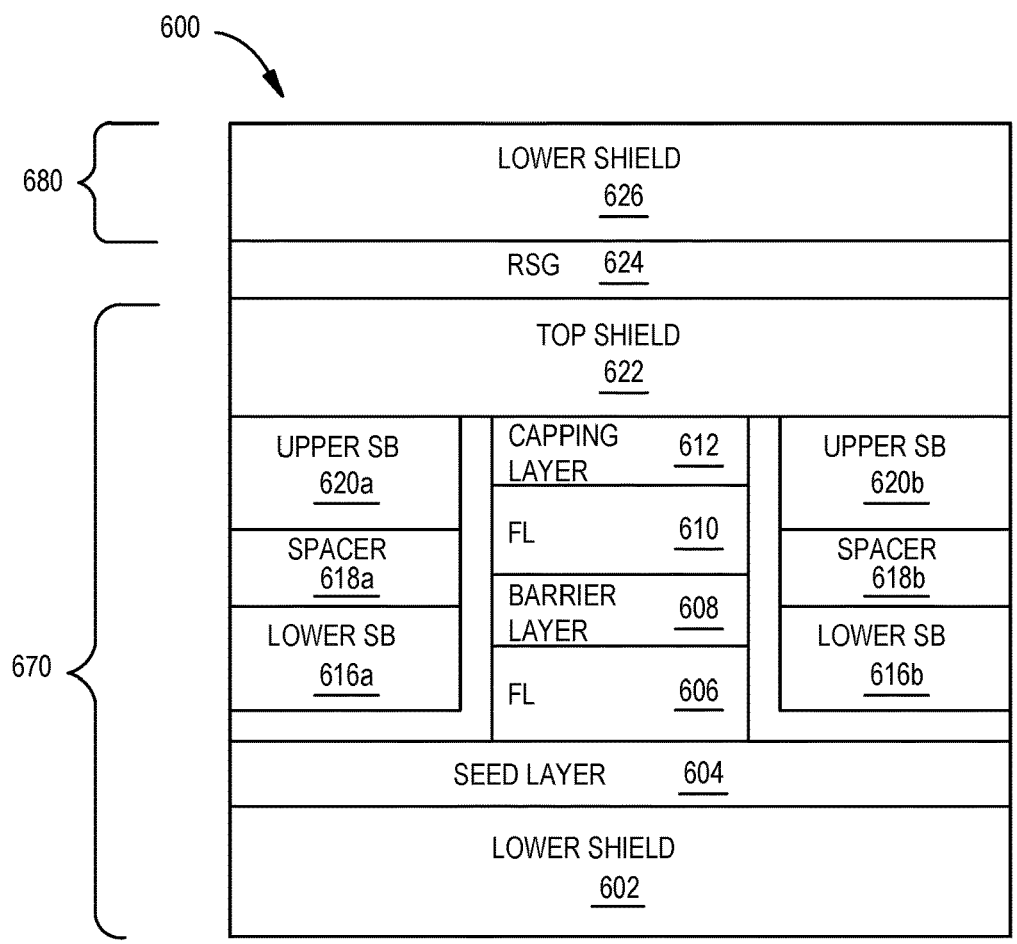

In FIG. 6D, the top shield 622, such as the second shield 422 of FIG. 4A, of the lower reader 670 is formed at block 512. At block 514, the RSG 624 is formed by the deposition of AlOx on the top shield 622 of the lower reader 670. The RSG 624 may be formed by photo printing, ion milling, metal refill, or lift-off. At block 516, the lower shield 626 of the upper reader 680 is formed on the RSG 624.

Figure 6E:
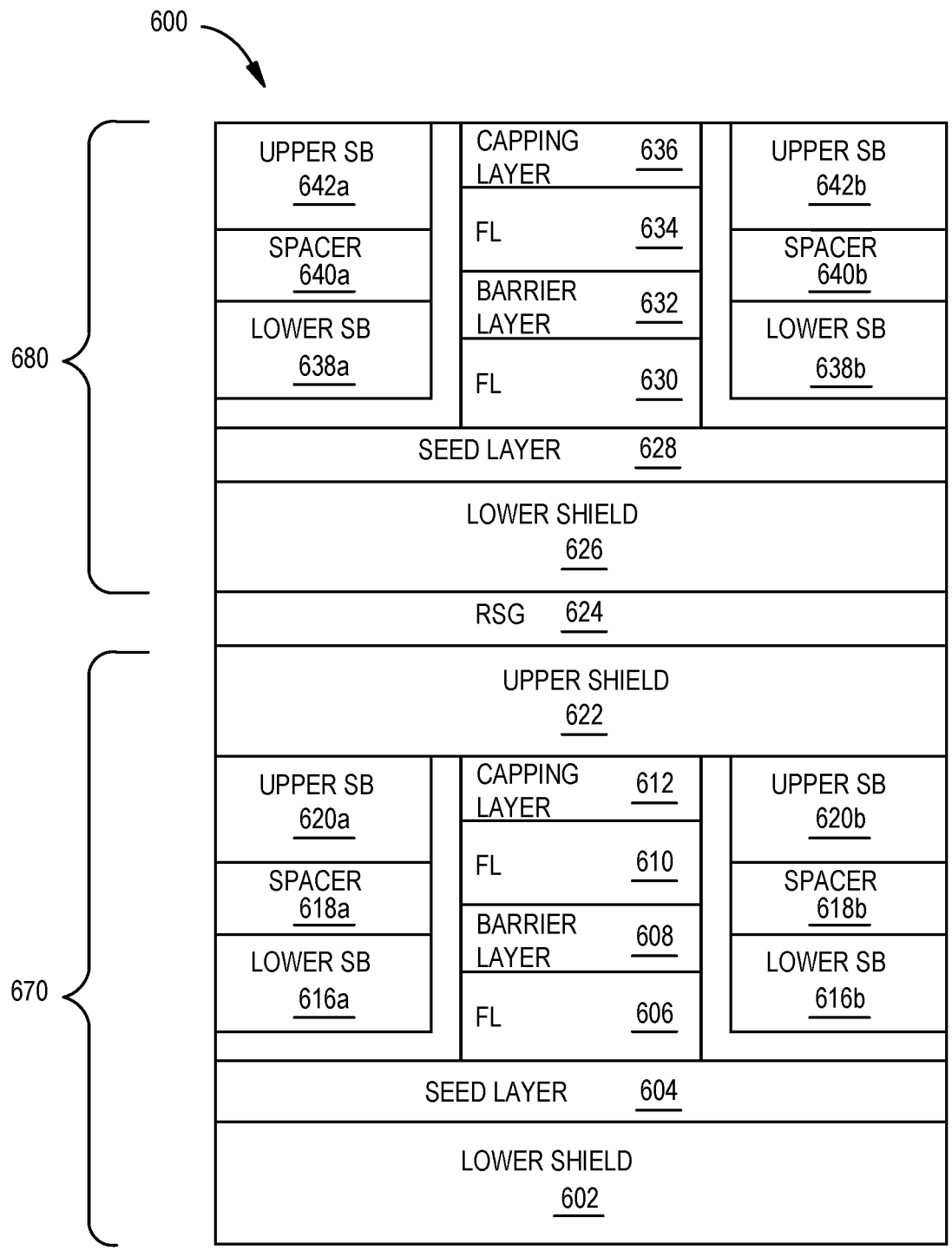

In FIG. 6E, the TMR structure is formed on the lower shield 626 of the upper reader 680 at block 518. The TMR structure includes the MTJ stack that includes the seed layer 628, the first FL 630, the barrier layer 632, the second FL 634, and the capping layer 636. Magnetic annealing is applied to the TMR structure after the TMR structure deposition. The SAF SB structures, such as the first lower SB 638a, the first spacer 640a, the first upper SB 642a, the second lower SB 638b, the second spacer 640b, and the second upper SB 642b, of the upper DFL reader 680 are formed at block 520. At block 518 and block 520, the process may include mask layer deposition and photo printing, RIE etching to form carbon hard mask (CHM) stencil, ion milling to define lower MTJ, junction insulation by atomic layer deposition (ALD) or ion beam deposition (IBD), SB deposition, side wall mill open, resist strip, and CMP.

Figure 6F:
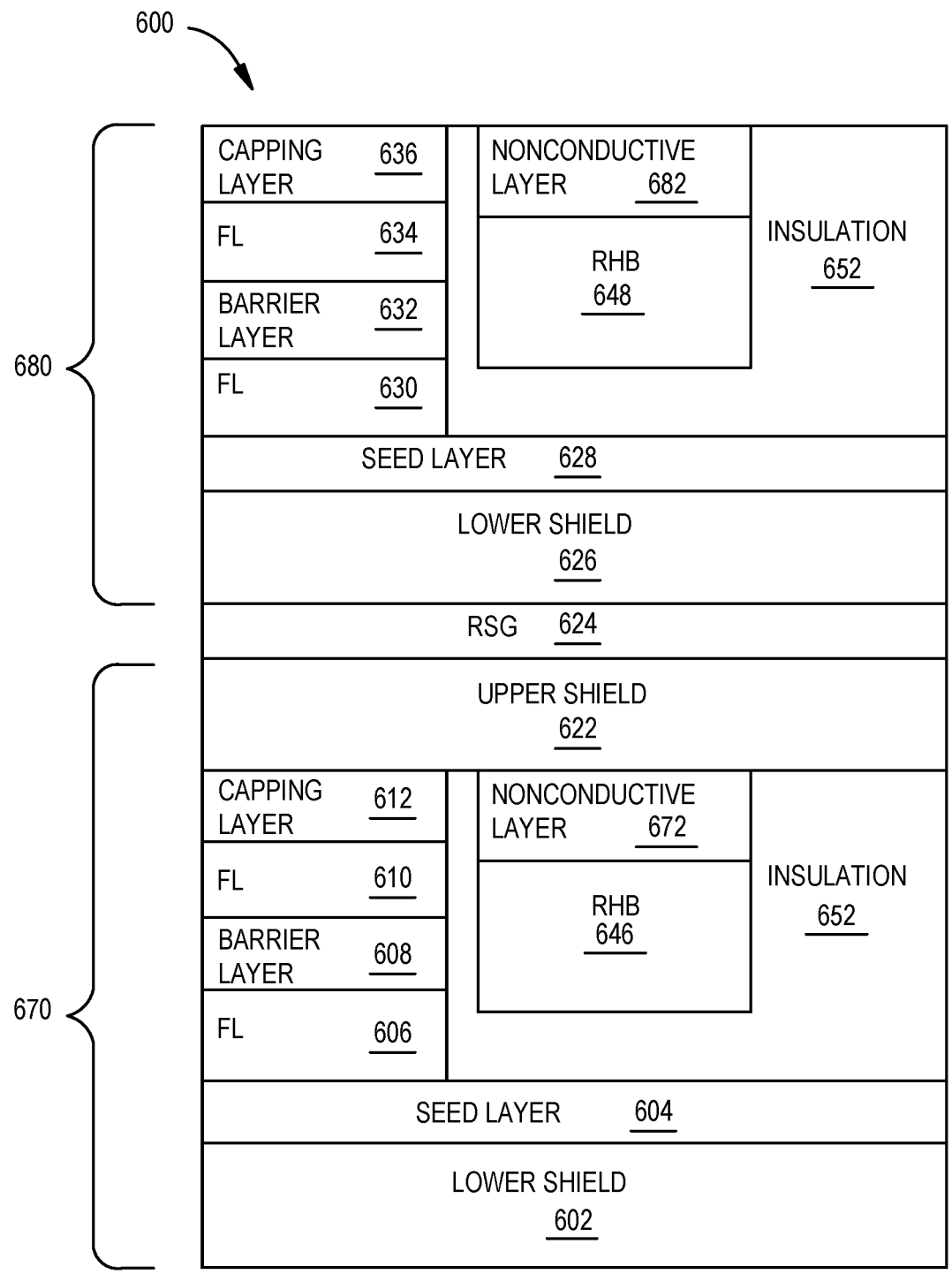

In FIG. 6F, the RHB 648 is formed for the upper reader 680 at block 522 and a nonmagnetic layer 682 is formed thereon. At block 524, the upper reader 680 is backfilled with junction insulation 652 (insulation 652). The process at block 522 and block 524 may also include photo printing, RIE etching, ion milling to define lower MTJ back edge, and junction insulation 652 by ALD or IBD. Furthermore, the gaps between each layer may be filled with dielectric materials that involve photo printing, AlOx deposition, and lift-off. The junction insulation 652 may be an AlOx deposition. The RHB 648, in one embodiment, includes seed layers such as Ta and W, a permanent magnet (e.g., CoPt), and a nonmagnetic capping layer (e.g., Ta). In order to prevent the magnet from corrosion during CMP and to generate topography that limits TDMR down track spacing (DTS) and lead resistance, a glancing angle milling is applied to flatten the RHB 648. The DTS is the spacing between the first free layer 606 of the lower reader 670 and the first free layer 630 of the upper reader 680. After the capping layer 636 deposition, a second glancing angle milling is applied to the MTJ stack to further flatten the RHB 648. After the milling occurs, the resist strip and CMP is applied to achieve device surface planarization. Furthermore, the electric lapping guide (ELG) may be formed during the steps outlined in block 522 and block 524. The milling depth of the upper reader 680 and the lower reader 670 determines the DTS and the lead resistance for the DFL TDMR read head 600.

Figure 6G:
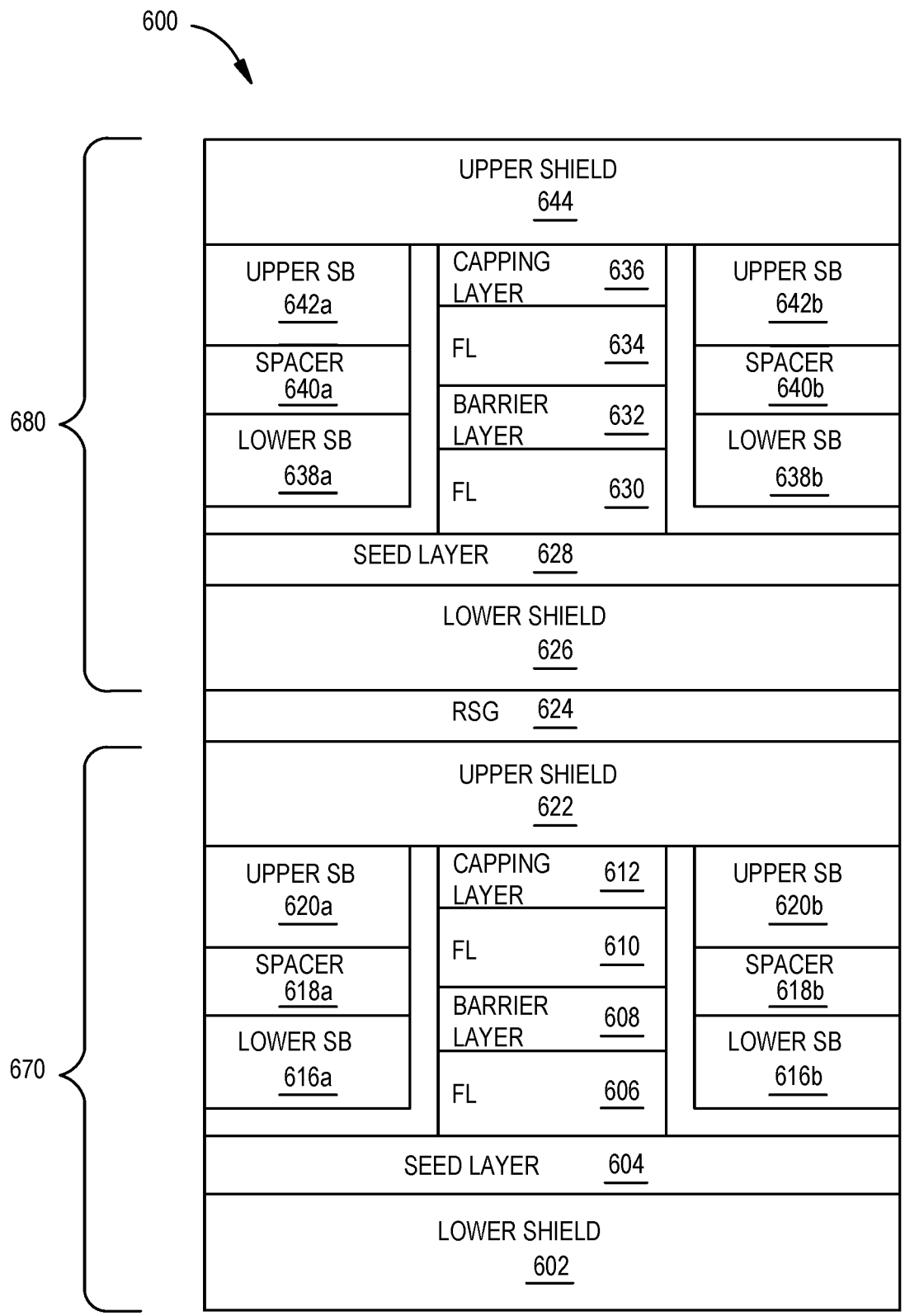
Figure 6H:
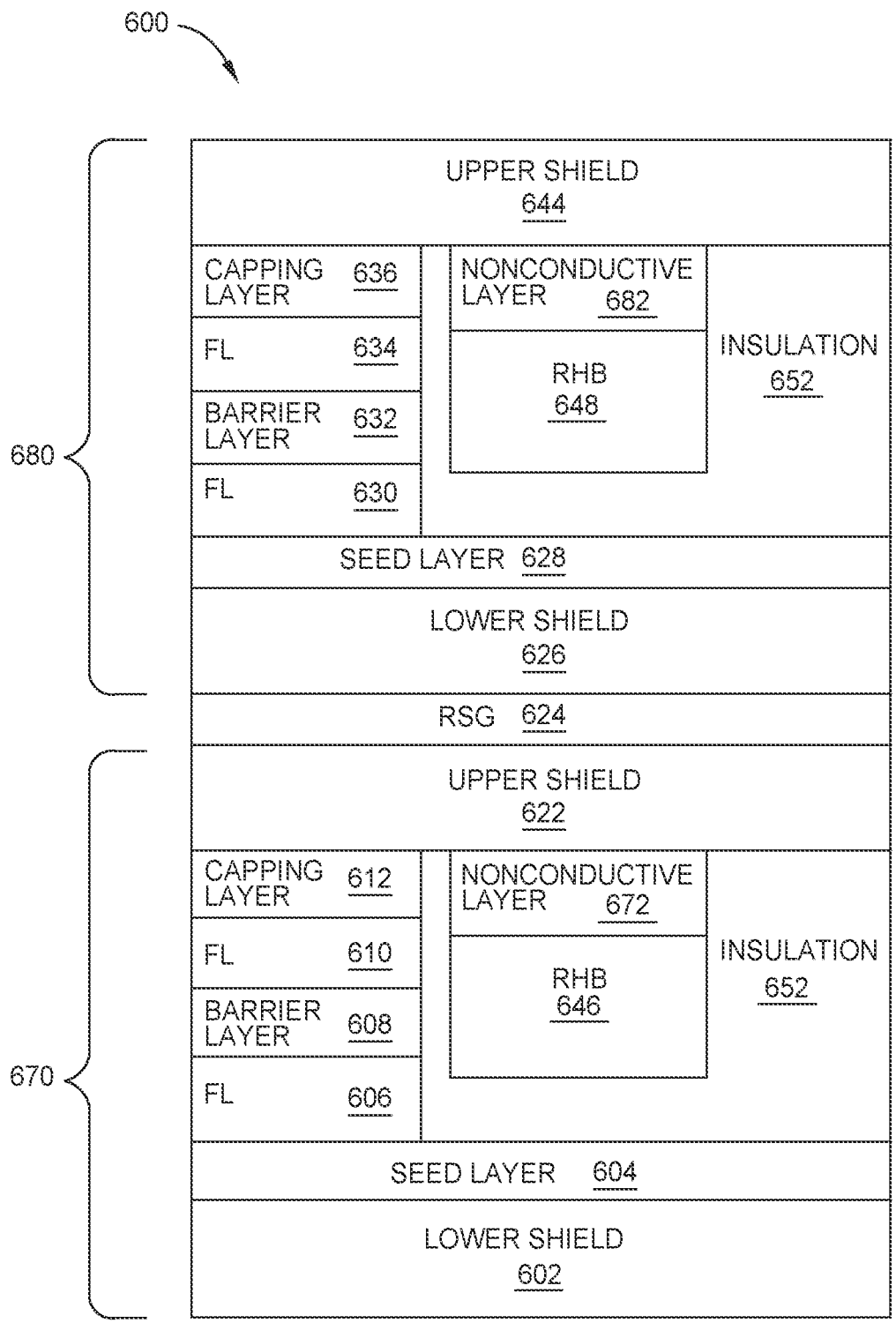

In FIGS. 6G-6H, at block 526, the top shield 644 of the upper reader 680 is formed on the MTJ stack of the upper reader 680. The top shield 644 may be formed through deposition of the top shield materials, photo printing, nickel iron (NiFe) plating, resist strip, and ion milling. In the DFL TDMR read head 600, the lower reader 670 SB layers and the upper reader 680 SB layers are antiparallel biased, such that when the respective RHB 646, 648 exerts a magnetic field on the MTJ structure of the lower reader 670 and the upper reader 680, the respective magnetic moments tilt to form a "scissor" state. Furthermore, the DFL TDMR read head 600 does not have an antiferromagnetic (AFM) layer to anchor the pinned layer (PL) to the seed layer of each MTJ stack, which may result in a thinner stack thickness and a lower performance degradation of the MTJ.

By using a dual free layer MTJ with SAF soft bias structures on the sides and a hard bias structure there behind, a TDMR head with improved reliability and ADC is realized without performance degradation.

In one embodiment, a two dimensional magnetic recording (TDMR) head comprises: a first reader including: a first lower shield; a first dual free layer (DFL) sensor disposed over the first lower shield; and an first upper shield disposed over the first DFL sensor; an insulating reader separation gap disposed over the first reader; and a second reader disposed over the insulating reader separation gap, the second reader including: a second lower shield; a second DFL sensor disposed over the second lower shield; and a second upper shield disposed over the second DFL sensor. The first DFL sensor comprises: a first seed layer; a first free magnetic layer disposed over the first seed layer; a first barrier layer disposed over the first free magnetic layer; a second magnetic free layer disposed over the first barrier layer; and a first capping layer disposed over the second magnetic free layer. The second DFL sensor comprises: a second seed layer; a third free magnetic layer disposed over the second seed layer; a second barrier layer disposed over the third free magnetic layer; a fourth magnetic free layer disposed over the second barrier layer; and a second capping layer disposed over the fourth magnetic free layer. The TDMR head further comprises a first rear hard bias structure disposed behind the first DFL sensor. The TDMR head further comprises a second rear hard bias structure disposed behind the second DFL sensor. The TDMR head further comprises at least one first synthetic antiferromagnetic (SAF) structure disposed adjacent the first DFL sensor. The TDMR head further comprises at least one second SAF structure disposed adjacent the second DFL sensor. A magnetic recording device comprising the TDMR head is also contemplated.

In another embodiment, a two dimensional magnetic recording (TDMR) head comprises: a first reader including: a first lower shield; a first sensor disposed over the first lower shield; a first upper shield disposed over the first sensor; and a first rear hard bias structure disposed behind the first sensor; an insulating reader separation gap disposed over the first reader; and a second reader disposed over the insulating reader separation gap, the second reader including: a second lower shield; a second sensor disposed over the second lower shield; a second upper shield disposed over the second sensor; and a second rear hard bias structure disposed behind the second sensor. The first rear hard bias structure comprises CoPt. The TDMR head further comprising a first nonmagnetic layer disposed over the first rear hard bias structure. The TDMR head further comprising insulating material disposed between the first sensor and the first rear hard bias structure. The first sensor and the second sensor do not include an antiferromagnetic layer. A magnetic recording medium comprising the TDMR head is also contemplated.

In another embodiment, a two dimensional magnetic recording (TDMR) head comprises: a first reader including: a first lower shield; a first sensor disposed over the first lower shield; an first upper shield disposed over the first sensor; and a first synthetic antiferromagnetic (SAF) soft bias (SB) structure disposed adjacent the first sensor; an insulating reader separation gap disposed over the first reader; and a second reader disposed over the insulating reader separation gap, the second reader including: a second lower shield; a second sensor disposed over the second lower shield; a second upper shield disposed over the second sensor; and a second SAF SB structure disposed adjacent the second sensor. The first SAF SB structure includes: a first lower SB layer disposed over a first seed layer of the first sensor; a first spacer layer disposed over the first lower SB layer; and a first upper SB layer disposed over the first spacer layer. The first sensor is a first dual free layer (DFL) sensor. The TDMR head further comprising a first read hard bias (RHB) structure disposed behind the first DFL sensor. The first sensor does not include a pinned layer. A magnetic recording medium including the TDMR head is also contemplated.

It is to be understood that the magnetic recording head discussed herein is applicable to a data storage device such as a hard disk drive (HDD) as well as a tape drive, such as a tape embedded drive (TED) or an insertable tape media drive. An example TED is described in patent application entitled "Head Assembly with Suspension System for a Tape Embedded Drive", U.S. patent application Ser. No. 16/365,034, filed Mar. 26, 2019 and assigned to the same assignee of the instant application. Any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

While the foregoing is directed to embodiments of the present disclosure, other and further embodiments of the disclosure may be devised without departing from the basic scope thereof, and the scope thereof is determined by the claims that follow.

What is claimed is:

1. A two dimensional magnetic recording (TDMR) head, comprising:
    a first reader including:
        a first lower shield having a first width at a media facing surface;
        a first seed layer disposed in contact with the first lower shield, the first seed layer having the first width at the media facing surface;
        a first dual free layer (DFL) sensor disposed over the first lower shield comprising a first magnetic free layer and a second magnetic free layer, the first magnetic free layer of the first dual free layer sensor being disposed in contact with the first seed layer; and
        a first upper shield layer disposed over and in contact with the first DFL sensor, the first upper shield layer being a single layer;
    at least one first synthetic antiferromagnetic (SAF) structure disposed adjacent to the first DFL sensor, the at least one first SAF structure comprising a first lower soft bias layer, a first spacer layer disposed on the first lower soft bias layer, and a first upper soft bias layer disposed on the first spacer layer and in contact with the first upper shield layer;
    an insulating reader separation gap disposed over the first reader, the insulating reader separation gap disposed in contact with the first upper shield layer; and
    a second reader disposed over the insulating reader separation gap, the second reader including:
        a second lower shield, the second lower shield being a single layer and having the first width at the media facing surface;
        a second seed layer disposed in contact with the second lower shield, the second seed layer having the first width at the media facing surface;
        a second DFL sensor disposed over the second lower shield, the second DFL sensor being aligned with the first DFL sensor at an air bearing surface, wherein a third magnetic free layer of the second DFL sensor is disposed in contact with the second seed layer; and
        a second upper shield layer disposed over the second DFL sensor.

2. The TDMR head of claim 1, wherein the first DFL sensor comprises:
    the first magnetic free layer disposed on the first seed layer;
    a first barrier layer disposed over the first magnetic free layer;
    the second magnetic free layer disposed over the first barrier layer; and
    a first capping layer disposed over the second magnetic free layer.

3. The TDMR head of claim 2, wherein the second DFL sensor comprises:
    the third magnetic free layer disposed over the second seed layer;
    a second barrier layer disposed over the third magnetic free layer;
    a fourth magnetic free layer disposed over the second barrier layer; and
    a second capping layer disposed over the fourth magnetic free layer.

4. The TDMR head of claim 2, wherein the first lower soft bias layer is disposed adjacent to a portion of the first magnetic free layer and a portion the first barrier layer, the first spacer layer is disposed adjacent to a portion of the first barrier layer and a portion of the second magnetic free layer, and the first upper soft bias layer is disposed adjacent to a portion of the second magnetic free layer and the first capping layer.

5. The TDMR head of claim 1, further comprising a first rear hard bias structure disposed behind the first DFL sensor.

6. The TDMR head of claim 4, further comprising a second rear hard bias structure disposed behind the second DFL sensor.

7. The TDMR head of claim 1, further comprising at least one second SAF structure disposed adjacent the second DFL sensor.

8. A magnetic recording device comprising the TDMR head of claim 1.

9. A two dimensional magnetic recording (TDMR) head, comprising:
    a first reader including:
        a first lower shield having a first width at a media facing surface;
        a first seed layer disposed in contact with the first lower shield, the first seed layer having the first width at the media facing surface;
        a first sensor disposed over the first lower shield, a first magnetic free layer of the first sensor being disposed in contact with the first seed layer;
        a first upper shield layer disposed over and in contact with the first sensor; and
        a first rear hard bias structure disposed behind the first sensor;

at least one first synthetic antiferromagnetic (SAF) structure disposed adjacent to the first sensor, the at least one first SAF structure comprising a first lower soft bias layer, a first spacer layer disposed on the first lower soft bias layer, and a first upper soft bias layer disposed on the first spacer layer and in contact with the first upper shield layer;

an insulating reader separation gap disposed over the first reader, the insulating reader separation gap disposed in contact with the first upper shield layer; and a second reader disposed over the insulating reader separation gap, the second reader including:
- a second lower shield, the second lower shield being a single layer and having the first width at the media facing surface;
- a second seed layer disposed in contact with the second lower shield, the second seed layer having the first width at the media facing surface;
- a second sensor disposed over the second lower shield, the second sensor being aligned with the first sensor at an air bearing surface, wherein a first magnetic free layer of the second sensor is disposed in contact with the second seed layer;
- a second upper shield layer disposed over the second sensor, the second upper shield layer being a single layer; and
- a second rear hard bias structure disposed behind the second sensor.

10. The TDMR head of claim 9, wherein the first rear hard bias structure comprises CoPt.

11. The TDMR head of claim 9, further comprising a first nonmagnetic layer disposed over the first rear hard bias structure.

12. The TDMR head of claim 9, further comprising insulating material disposed between the first sensor and the first rear hard bias structure.

13. The TDMR head of claim 9, wherein the first sensor and the second sensor do not include an antiferromagnetic layer.

14. The TDMR head of claim 9, wherein the first lower shield has a first length from the media facing surface into the TDMR head, the first seed layer has the first length from the media facing surface into the TDMR head, the second lower shield has the first length from the media facing surface into the TDMR head, and the second seed layer has the first length from the media facing surface into the TDMR head.

15. A magnetic recording device comprising the TDMR head of claim 9.

16. A two dimensional magnetic recording (TDMR) head, comprising:
a first reader including:
- a first lower shield, the first lower shield being a single layer and having a first width at a media facing surface;
- a first seed layer disposed in contact with the first lower shield, the first seed layer having the first width at the media facing surface;
- a first sensor disposed over the first lower shield, a first magnetic free layer of the first sensor being disposed in contact with the first seed layer;
- a first upper shield layer disposed over and in contact with the first sensor, the first upper shield layer being a single layer; and
- a first synthetic antiferromagnetic (SAF) soft bias (SB) structure disposed adjacent the first sensor, the first SAF SB structure comprising a first lower soft bias layer, a first spacer layer disposed on the first lower soft bias layer, and a first upper soft bias layer disposed on the first spacer layer and in contact with the first upper shield layer;

an insulating reader separation gap disposed over the first reader, the insulating reader separation gap disposed in contact with the first upper shield layer; and a second reader disposed over the insulating reader separation gap, the second reader including:
- a second lower shield and having the first width at the media facing surface;
- a second seed layer disposed in contact with the second lower shield, the second seed layer having the first width at the media facing surface;
- a second sensor disposed over the second lower shield, the second sensor being aligned with the first sensor at an air bearing surface, wherein a first magnetic free layer of the second sensor is disposed in contact with the second seed layer;
- a second upper shield layer disposed over the second sensor; and
- a second SAF SB structure disposed adjacent the second sensor, the second SAF SB structure comprising a second lower soft bias layer, a second spacer layer disposed on the second lower soft bias layer, and a second upper soft bias layer disposed on the second spacer layer and in contact with the second upper shield layer.

17. The TDMR head of claim 16, wherein the first sensor is a first dual free layer (DFL) sensor.

18. The TDMR head of claim 17, further comprising a first rear hard bias (RHB) structure disposed behind the first DFL sensor.

19. The TDMR head of claim 16, wherein the first sensor does not include a pinned layer.

20. A magnetic recording device including the TDMR head of claim 16.

* * * * *